H. J. FEREDAY.
STRESS RECORDER.
APPLICATION FILED OCT. 14, 1918.

1,307,902.

Patented June 24, 1919.
6 SHEETS—SHEET 1.

INVENTOR
HARRY J. FEREDAY
BY
ATTORNEYS

H. J. FEREDAY.
STRESS RECORDER.
APPLICATION FILED OCT. 14, 1918.

1,307,902.

Patented June 24, 1919.
6 SHEETS—SHEET 2.

INVENTOR
HARRY J. FEREDAY
BY Howson and Howson
ATTORNEYS

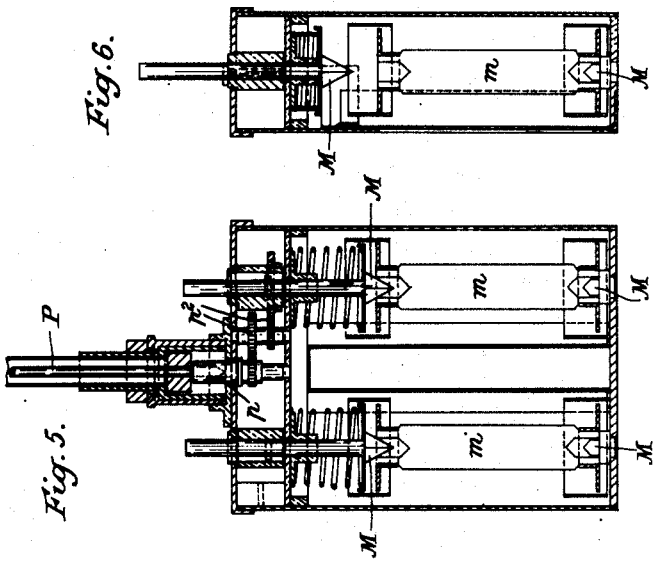
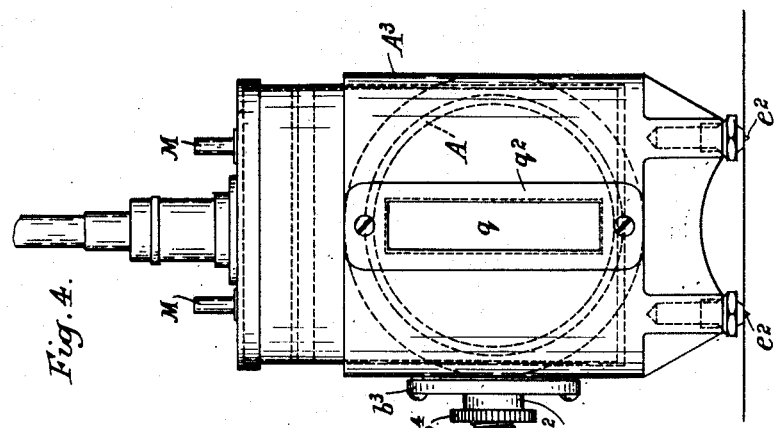
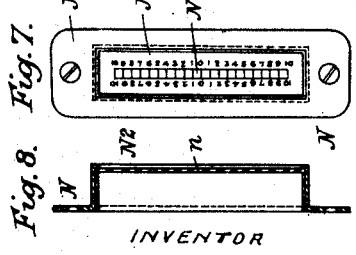

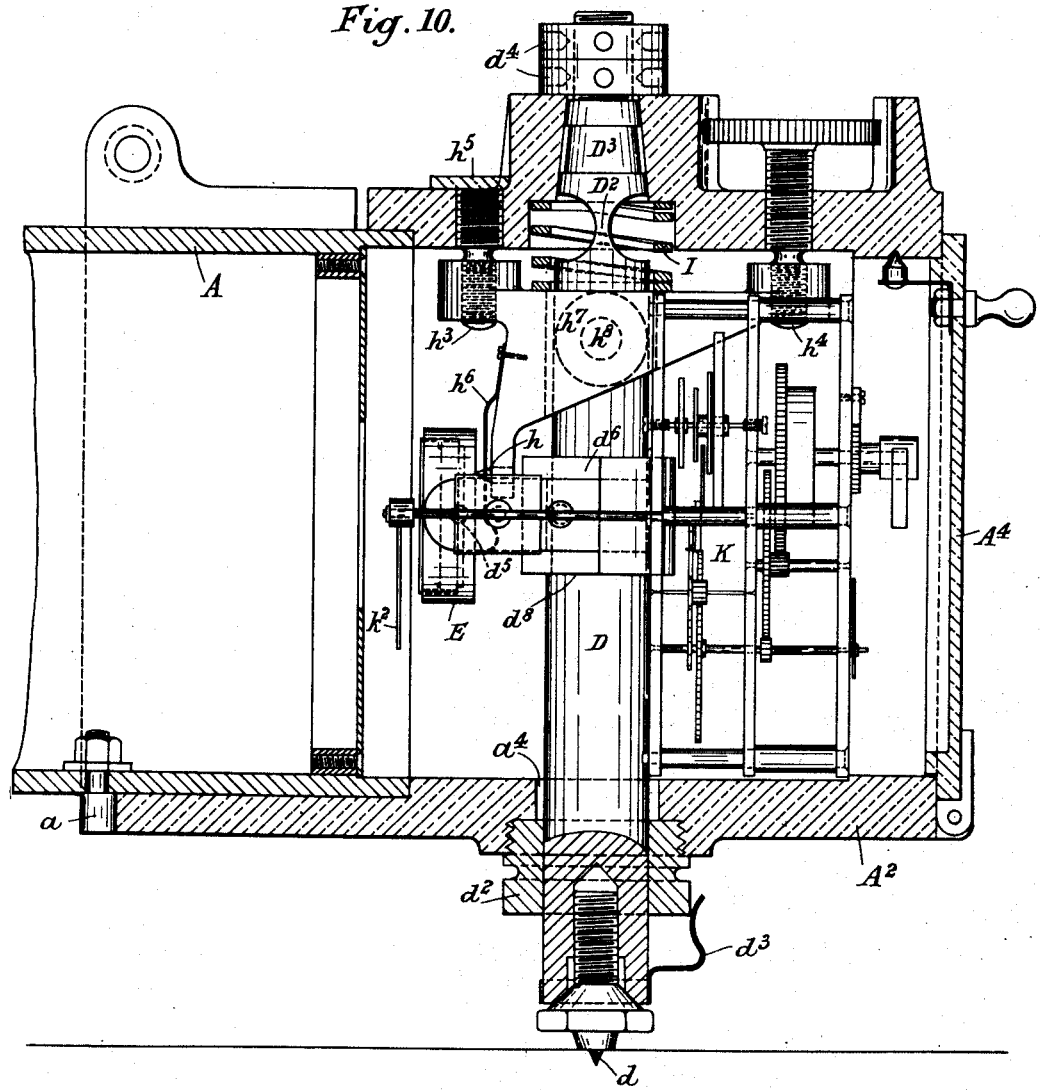

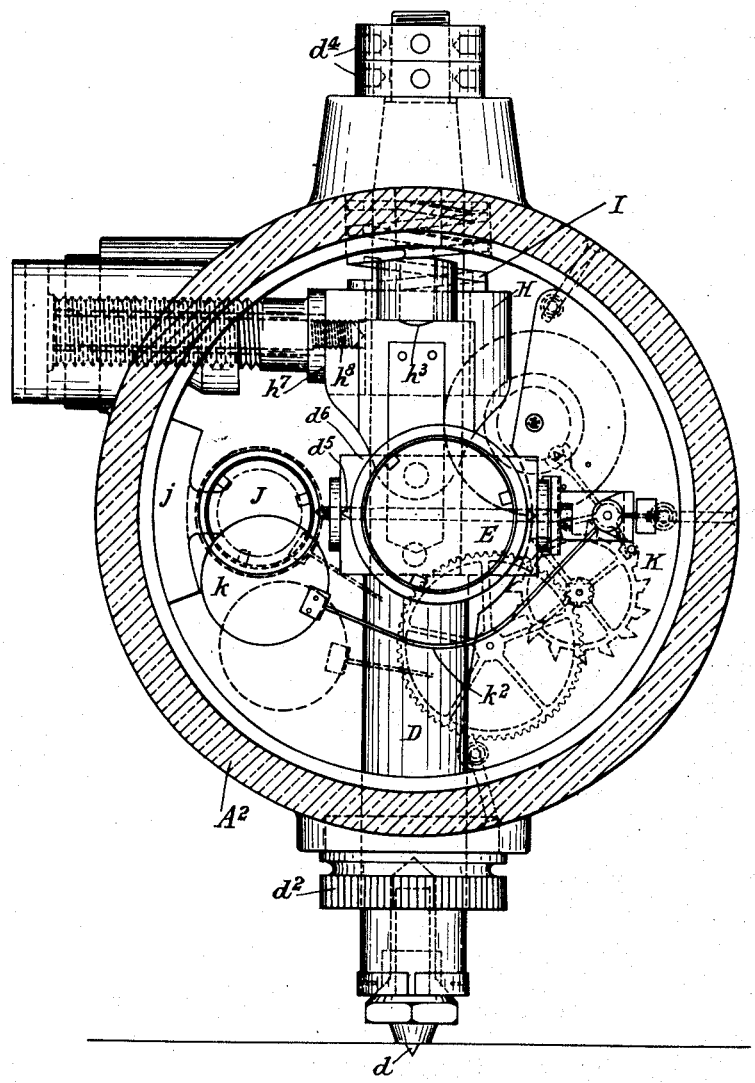

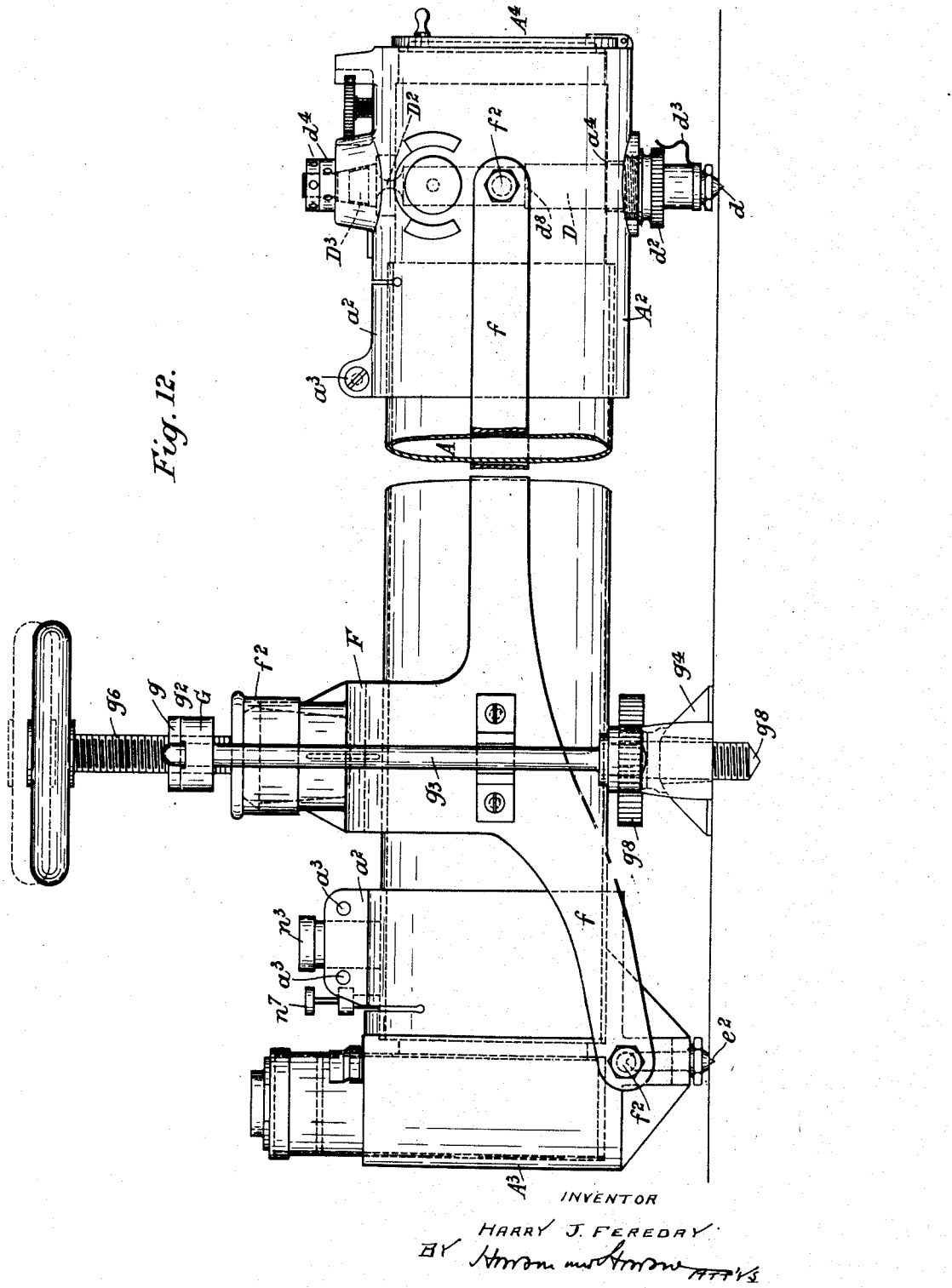

UNITED STATES PATENT OFFICE.

HARRY JOHN FEREDAY, OF UPPER TOOTING, LONDON, ENGLAND, ASSIGNOR OF ONE-HALF TO FREDERICK PALMER, OF WESTMINSTER, ENGLAND.

STRESS-RECORDER.

1,307,902.   Specification of Letters Patent.   Patented June 24, 1919.

Application filed October 14, 1918. Serial No. 258,054.

*To all whom it may concern:*

Be it known that I, HARRY JOHN FEREDAY, a subject of the King of Great Britain, residing at 22 Huron road, Upper Tooting, in the county of London, England, have invented new and useful Improvements in Stress-Recorders, of which the following is a specification.

This invention relates to apparatus for measuring and recording vibrations, stresses, and alterations in length, in iron or steel bridges, and other bodies, such instruments being commonly known as extensometers, the object of the said invention being to provide an instrument which will give very accurate indications and records of stresses, alterations in length, and vibrations, in the bodies tested. Such instrument may be termed a stress recorder.

Figure 1:
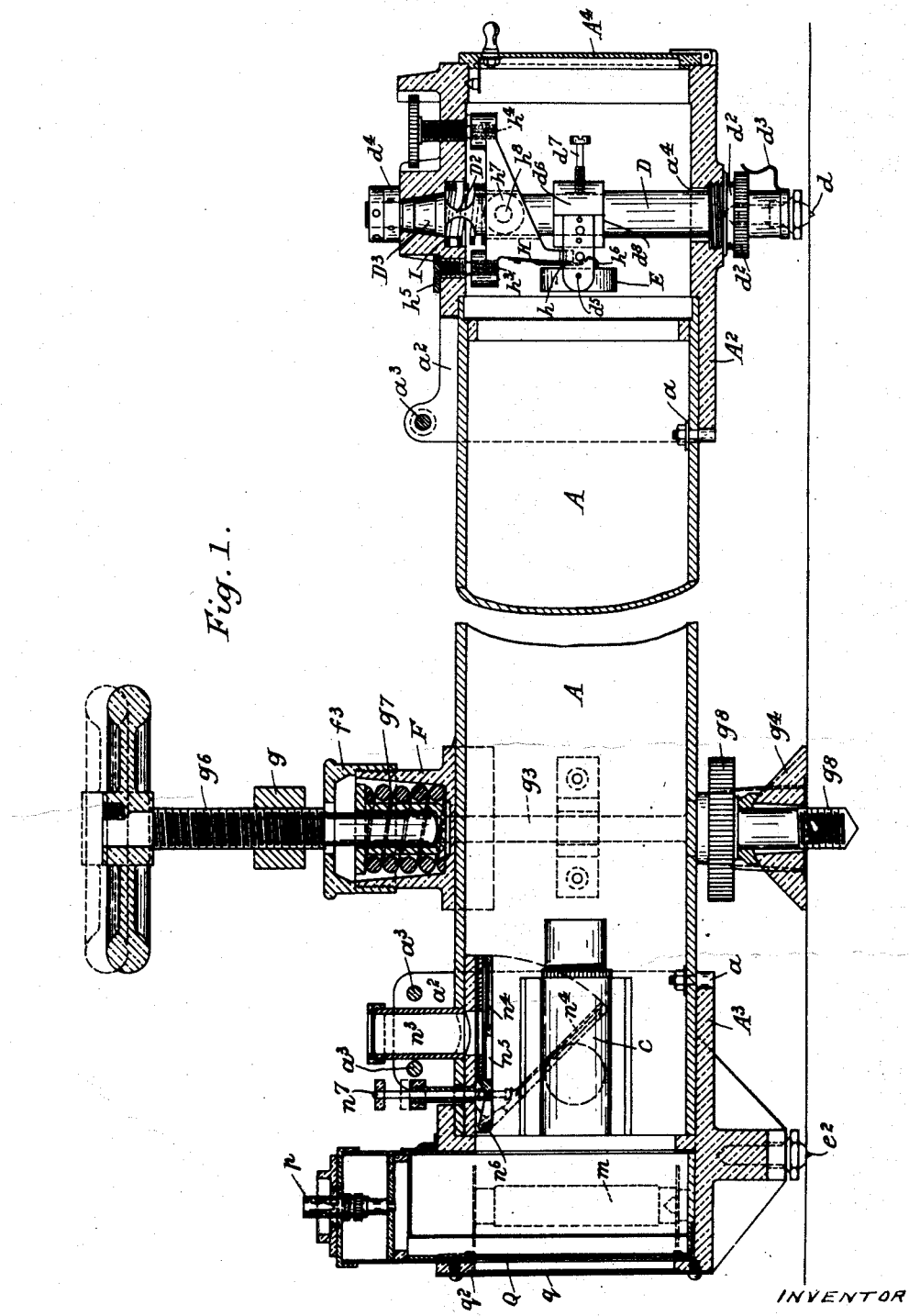
Figure 2:
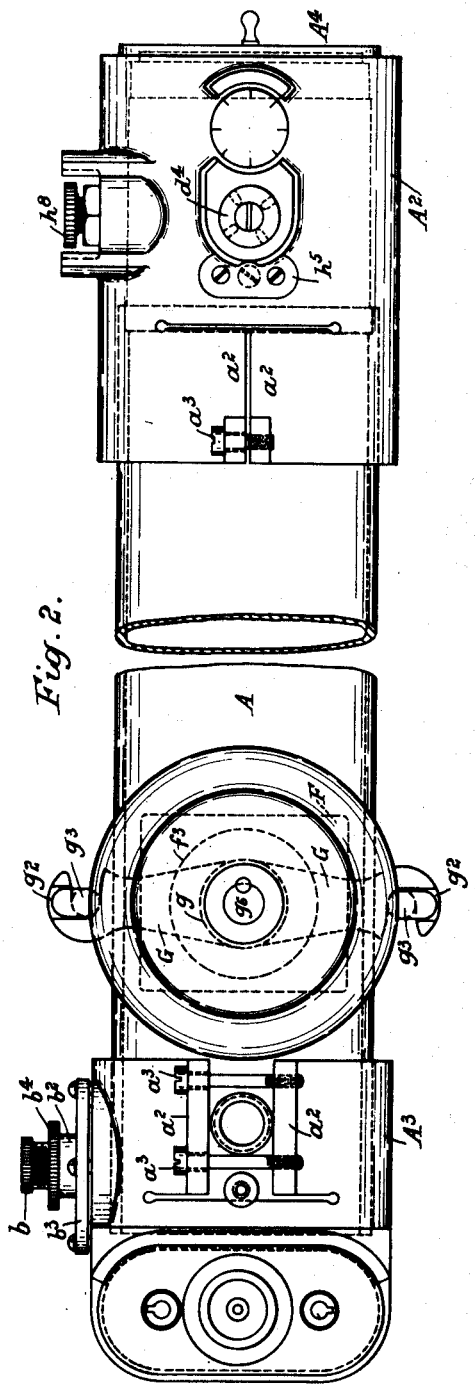
Figure 3:
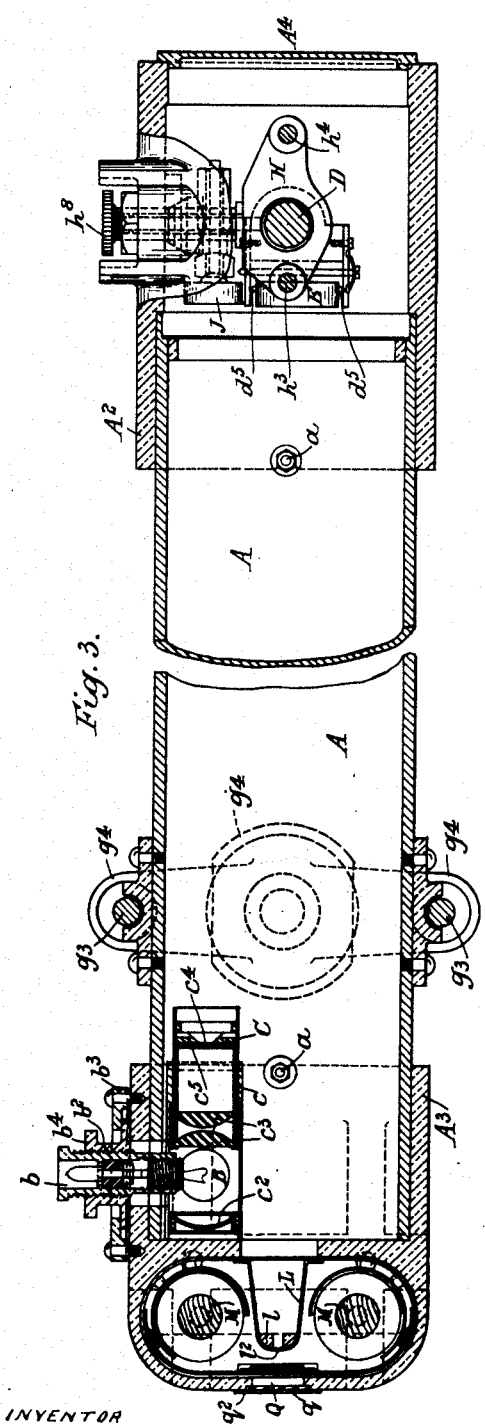

In the accompanying drawings which represent an illustrative embodiment of my invention, Figure 1 is a longitudinal vertical section; Fig. 2 a plan and Fig. 3 a horizontal section. In these figures the mid part of the instrument (which may be of any suitable length) is represented as being broken away. Fig. 4 is an end elevation of the instrument as seen from the left-hand end of Fig. 1. Figs. 5 and 6 are vertical sections at right angles to each other, of the sensitized film-operating parts at the same end. Figs. 7, 8, and 9, are respectively an elevation and vertical and transverse sections of a scale for attachment in place of the sensitized film for observing the indications from the end of the instrument in calibrating it, or during use. Figs. 10 and 11, are longitudinal and transverse sections (drawn to a larger scale) of the parts at the end of the instrument at the right-hand end of Fig. 1. Fig. 12 is a side elevation showing the arrangement by which the stresses due to the attachment of the instrument to the body to be tested are taken by additional beams instead of by the tube, or casing, A, forming the body of the instrument, these additional beams enabling such tube, or casing, to be made of very thin material if so desired.

The body-part of the instrument consists of a tubular casing A, in which is inclosed an electric lamp B, the holder $b$ of which is screwed into the internally screwed boss of the piece $b^2$, clamped to the side of the instrument by the plate $b^3$, screwed to the end-piece $A^3$, the said holder $b$, being secured in position by the lock-nut $b^4$. Inside the casing is secured the mounting $c$, carrying the reflector $c^2$ and lenses $c^3$, and also the piece C, in which is the short slit $c^4$, covered by a piece of ground glass $c^5$. The mirror E, upon which the rays of light from the slit $c^4$, are received is mounted upon a leg D which carries one of the points ($d$) on which the instrument is carried by the bridge, or other body, being tested, the other points ($e^2$, $e^2$), being at, or toward, the other end of the casing A. The device by means of which the instrument is secured to the bridge, or other body, to be tested, is illustrated as consisting of a saddle-piece F attached to the tube, or casing, (shown in Figs. 1 and 2) and an upper member G, with ends $g^2$, arranged to engage the bent-over tops of the side members $g^3$ which are secured to the lower member $g^4$, which bears on the bridge, or other body, to be tested for stresses, or alterations in length. The upper member G, is formed with a nut $g$, through which passes a screw $g^6$ which can be screwed down into a spring-pressed cup $g^7$, (see Fig. 1) inside the saddle-piece F, which can be closed by the screw-cap $f^3$. The lower member $g^4$, carries the screw $g^8$, which is screwed into a screwed hole made in the bridge, or other body, to be tested, for stresses, or alterations in length, the screw $g^6$, being screwed down to secure the instrument rigidly in position. In the modification shown in Fig. 12 the saddle-piece F, has side arms $f$, extending forward and rearward and connected to the end-pieces $A^2$ and $A^3$, of the casing by screw-pins $f^2$ thereby taking all the stresses direct to the leg D and the points $e^2$.

The lower end of the leg D, passes through a somewhat larger opening $a^4$ in the end-piece $A^2$ and carries a screw-piece $d^2$, slidable upon the said leg and capable of being screwed into the opening $a^4$ when the instrument is not in use. After the instrument has been fixed in position for work, the screw-piece $d^2$ is unscrewed from the hole $a^4$ and lowered upon the leg clear of the said hole and is held in the withdrawn position by a spring-clip $d^3$ and the leg D, can then oscillate in the hole $a^4$. The upper end of the said leg D, is thinned at $D^2$, so that it will vibrate upon this part as upon a center, its upper end being cone-shaped as shown at $D^3$, to fit truly in the conical hole for it in a boss on the end-piece $A^2$, of the casing A. The said leg is secured by the nuts $d^4$ screwed on its end.

The mirror E, is mounted between pivot pins $d^5$, carried by a piece $d^6$, secured by the screw $d^7$, (see Fig. 1) to the leg D, and supported upon a ledge $d^8$, formed on the said leg D. The back of the mirror E, (preferably with the intervention of a jewel such as a white sapphire, for instance) is caused, by the spring $h^6$, to bear against a point $h$, carried by a support H, having screwed holes in it with which holes differential, or micrometer, screws $h^3$ and $h^4$ engage for operation as hereinbefore explained for calibrating the instrument and for altering the initial position of the mirror E as required. The head of the screw $h^3$ is covered by a plate $h^5$, secured in place by screws when calibration has been effected. The spring I, bears against the support H, to keep it, while the instrument is being calibrated, in position by taking up any tendency to slackness in the calibrating and adjusting screws $h^3$, $h^4$. After calibration and while records are being taken, the support H, is held firmly in position against the face $h^7$, by screwing in the screw $h^8$.

At the side of the mirror E, is the stationary mirror J, (Figs. 3 and 11) carried from the side of the end-piece $A^2$, by the bracket $j$, and in front of this mirror J is a shutter $k$, (see Figs. 10 and 11) connected by an arm $k^2$ with clockwork K, so as to be moved in front of the said mirror J, to cut off the light therefrom at intervals for constituting the base, or zero line, a time record as aforesaid. The opposite end-piece $A^3$, of the casing A, carries the plate L, stiffened by the bars $l$, and having in it the aforesaid long slit $l^2$, at right angles, or transverse, to the short slit $c^4$, in the piece C. On each side of the plate L, are the carriers M, of the spools $m$, (see also Figs. 5 and 6) for the sensitized film. These spool-carriers and spools are in such position that the film, as it is traversed, bears upon and passes across, the slotted plate L.

The end-pieces $A^2$, $A^3$, of the casing may be attached to the tubular body-part A thereof in any suitable way. They are shown as being registered in position by pegs and slots $a$, at the underside and secured by slitted clamping parts $a^2$ and screws $a^3$ at the upper side.

The sensitized film may be traversed by hand, or by any other suitable means. It is shown as being traversed by inserting the end of a flexible shaft P (driven by any suitable means) into a stem $p$, which carries a pinion which, through gear wheels $p^2$, conveys motion to one of the spool carriers.

In the end-piece $A^3$, is shown a slot Q which is covered by red-glass $q$, or the equivalent, (confined by the frame $q^2$) through which the usual marking on the covering, or back, of the film can be observed.

If desired, instead of, or in addition to, recording on a sensitized film as aforesaid, the instrument can be provided with a ground glass, or like, surface carrying a scale, upon which the movements of the aforesaid spots of light can be observed, in calibrating, or during use. An arrangement for this purpose is shown in Figs. 7, 8 and 9, consisting of a slotted frame N with an inwardly projecting part $N^2$, which replaces the red glass, or the like, $q$, and the sensitized film the projecting part $N^2$, being slotted at $n$ and covered with ground glass marked with a scale as shown in Fig. 7. The said slot $n$ is coincident with the slit $l^2$ in the plate L, when the device N is in place.

I may provide a spy-hole and tube $n^3$, (see Fig. 1) beneath which is a frame $n^5$ carrying a plane mirror $n^4$, hinged to the casing at $n^6$.

When it is desired to observe the intensity and relative positions of the beams of light through this spy tube, the frame $n^5$, (with the mirror $n^4$) is pressed down by the pusher $n^7$, into the position shown in dotted lines.

The end-piece $A^2$, is shown as being provided with a door $A^4$, with a spring-catch fastening, which door will give access to the interior of the instrument at this end, when desired.

When vibrations in a body are to be observed, or recorded, I fix the instrument to a rigid body in proximity to that to be tested and rest the point $d$ of the leg D upon the body to be tested.

What I claim is:—

1. An instrument comprising a casing tube, means for supporting the same, a source of light arranged in the casing tube, a projector having a slit for the passage of rays from the source of light, a movable mirror to reflect such rays, a member associated with said mirror adapted to be applied to the body tested, a screen having a slit transverse to the slit in the projector, means for passing a sensitized surface across the screen slit for the purpose of obtaining a photographic record on the sensitized surface of the stresses in the body tested.

2. An instrument comprising a casing tube, means for supporting the same, a source of light arranged in the casing tube, a projector having a slit for the passage of rays from the source of light, a movable mirror to reflect such rays, a member associated with said mirror adapted to be applied to the body tested, a screen having a slit transverse to the slit in the projector, means for passing a sensitized surface across the screen slit for the purpose of obtaining a photographic record on the sensitized surface of the stresses in the body tested, in combination with a stationary mirror to reflect certain of the rays of the source of light to the screen slit for the purpose specified.

3. An instrument comprising a casing tube, a source of light arranged therein, a projector having a slit for the passage of rays from the source of light, a vibratory leg adapted to support the casing at one point upon the body tested, a mirror mounted on said leg and serving to reflect the rays from the source of light, a screen having a slit transverse to the slit in the projector, means for passing a sensitized surface across the screen slit for the purpose of obtaining a photographic record on the sensitized surface of the stresses in the body tested, two points of support for the casing spaced triangularly with relation to the vibratory leg, and means arranged between the several points of support for securing the instrument in testing position.

4. An instrument comprising a casing tube, a source or light arranged in the casing tube, a mirror to reflect said rays, a support for said mirror adapted to be applied to the body tested, a fixed bearing for the mirror, and means for pressing the latter against said bearing to cause the mirror to oscillate on said bearing during vibration of the mirror support, together with means for obtaining a photographic record of the mirror oscillations.

5. An instrument comprising a casing tube, a source of light arranged in the tube, a mirror to reflect said rays, a post supporting said casing upon the body tested, and means for mounting the mirror on said post, said post having a reduced portion serving as a center upon which the post vibrates with the body tested, and means for obtaining a photographic record of the vibrations thereby imparted to the mirror.

6. An instrument comprising a casing tube, a source of light arranged in the casing tube, a mirror to reflect said rays, a support for said mirror adapted to be applied to the body tested, a fixed bearing for the mirror, and means for pressing the latter against said bearing to cause the mirror to oscillate on said bearing during vibration of the mirror support, differential screws for adjusting and calibrating the position of the mirror, together with means for obtaining a photographic record of the mirror oscillations.

7. An instrument comprising a casing tube, means for supporting the same, a source of light arranged in the casing tube, a projector having a slit for the passage of rays from the source of light, a movable mirror to reflect such rays, a member associated with said mirror adapted to be applied to the body tested, a screen having a slit transverse to the slit in the projector, means for passing a sensitized surface across the screen slit for the purpose of obtaining a photographic record on the sensitized surface of the stresses in the body tested, in combination with a stationary mirror to reflect certain of the rays of the source of light to the screen slit for the purpose specified, and means for intermittently interrupting the rays reflected from the fixed mirror.

8. An instrument comprising a casing tube, means for supporting the same, a source of light arranged in the casing tube, a projector having a slit for the passage of rays from the source of light, a movable mirror to reflect such rays, a member associated with said mirror adapted to be applied to the body tested, a screen having a slit transverse to the slit in the projector, means for passing a sensitized surface across the screen slit for the purpose of obtaining a photographic record on the sensitized surface of the stresses in the body tested, together with means for readily removing the sensitized surface to permit its replacement by a scaled ground glass for optical observation of the record.

9. An instrument comprising a casing tube, means for supporting the same, a source of light arranged in the casing tube, a projector having a slit for the passage of rays from the source of light, a movable mirror to reflect such rays, a member associated with said mirror adapted to be applied to the body tested, a screen having a slit transverse to the slit in the projector, means for passing a sensitized surface across the screen slit for the purpose of obtaining a photographic record on the sensitized surface of the stresses in the body tested.

In testimony whereof I have signed my name to this specification in the presence of two subscribing witnesses.

HARRY JOHN FEREDAY.

Witnesses:
G. F. TYSON,
LEONARD WALTER.